(12) United States Patent
Kenna et al.

(10) Patent No.: US 9,098,228 B2
(45) Date of Patent: Aug. 4, 2015

(54) DETERMINING CONTENT RENDERING CAPABILITIES FOR WEB BROWSER OPTIMIZATION

(71) Applicant: International Business Machines Corporation, Armonk, NY (US)

(72) Inventors: Stephen J. Kenna, Cary, NC (US); Dana L. Price, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 13/732,538

(22) Filed: Jan. 2, 2013

(65) Prior Publication Data
US 2014/0189545 A1 Jul. 3, 2014

(51) Int. Cl.
G06F 3/00 (2006.01)
G06F 3/14 (2006.01)
G06F 17/30 (2006.01)

(52) U.S. Cl.
CPC ........ G06F 3/14 (2013.01); G06F 17/30 (2013.01); G06F 17/30905 (2013.01); G09G 2370/027 (2013.01)

(58) Field of Classification Search
CPC ............ G06F 11/3688; G06F 11/3664; G06F 11/3466; G06F 11/36
USPC ........... 715/234, 757, 760; 717/124, 126, 127
See application file for complete search history.

(56) References Cited

U.S. PATENT DOCUMENTS

| 7,478,330 B1 | 1/2009 | Branson et al. |
| 7,496,847 B2 | 2/2009 | Koehane et al. |
| 2004/0155901 A1* | 8/2004 | McKee et al. .............. 345/747 |
| 2009/0049391 A1 | 2/2009 | Abuelsaad et al. |
| 2010/0218106 A1 | 8/2010 | Chen et al. |
| 2011/0157219 A1 | 6/2011 | Chakra et al. |
| 2013/0339842 A1* | 12/2013 | Zhang et al. ................ 715/234 |
| 2013/0346949 A1* | 12/2013 | Chang et al. ................ 717/127 |
| 2014/0149995 A1* | 5/2014 | Tian .............................. 719/313 |

OTHER PUBLICATIONS

Disclosed Anonymously; "Optimal browser selection for a given website or web application"; IP.com Prior Art Database; IP.com No. IPCOM000198140D; Published Jul. 26, 2010; <http://priorartdatabase.com/IPCOM/000198140>.

IBM; "Method for quick browser switch"; IP.com Prior Art Database; IP.com numbe IPCOM000029947D; Published Jul. 19, 2004; <http://www.ip.com/pubview/IPCOM000029947D>.

Wikipedia, the free encyclopedia; "Compassion of layout engines (HTML5)"; Printed Sep. 6, 2012; <http://en.wikipedia.org/wiki/Comparison_of_layout_engines_(HTML5)>.

Mitchell, et al.; "dojo/has"; Printed Sep. 6, 2012; <http://livedocs.dojotoolkit.org/dojo/has>.

* cited by examiner

*Primary Examiner* — Haoshian Shih
(74) *Attorney, Agent, or Firm* — Nicholas L. Cadmus

(57) ABSTRACT

In a method for determining content rendering capabilities of one or more web browsers, a computer receives an indication of an event affecting one or more content rendering capabilities of a first web browser of one or more web browsers. The computer, in response to receiving the indication of the event affecting the one or more content rendering capabilities of the first web browser, determines the one or more content rendering capabilities of the first web browser. The computer updates a data file responsive to the determination of the one or more content rendering capabilities of the first web browser.

19 Claims, 4 Drawing Sheets

DETERMINING CONTENT RENDERING CAPABILITIES FOR WEB BROWSER OPTIMIZATION

TECHNICAL FIELD

The present invention relates generally to web browsers and more specifically to a method, system, and computer program product for determining the content rendering capabilities of a web browser.

BACKGROUND

Web browsers were originally designed as user-friendly portals to the internet's resources that facilitated internet navigation and information search, but have since evolved into more sophisticated and complex software applications. Web browsers now incorporate sophisticated multimedia rendering functions (video, audio, imaging, etc.) and enable a user to navigate and interact dynamically with connected websites and other internet users.

Uniform resource locators or URLs are the addresses of internet resources on the World Wide Web, e.g., a webpage that is on a website. A prefix to the URL is a Uniform Resource Identifier (URI) which specifies how the URL is interpreted. A common URI contains a character string "http" which identifies the URL as a resource to be retrieved over the Hypertext Transfer Protocol (HTTP). Other common prefixes are "https" (for Hypertext Transfer Protocol Secure), "ftp" (for File Transfer Protocol), and "file" (for files that are stored locally on a user's computer). If a URL points to a website, which is often a case, the web browser uses the URL to access the website and retrieve the webpage from the website.

Once the webpage has been retrieved the web browser will display it. Hypertext Markup Language (HTML) documents and any associated content (text, images, video, audio, etc.) are passed to the web browser's layout engine to be transformed from markup to an interactive document, a process known as "rendering." Webpages frequently include other content such as formatting information (e.g., Cascading Style Sheets) and scripts (e.g., JavaScript) into their final presentation.

Webpages have progressed from static pages to full-blown user customizable applications. A web application is a computer software application that is coded in a web browser-supported programming language (e.g., HTML or JavaScript) and reliant on a common web browser to render the application executable.

With the constant emergence of new webpage technologies, such as HTML 5, not all web browsers are able to render content as originally intended by the website's author. In addition, many web browsers rely on plug-ins to display web content properly. Consequently, websites will function and display differently based on the content rendering capabilities of the web browser.

SUMMARY

Aspects of an embodiment of the present invention disclose a method, computer program product, and a computer system for determining content rendering capabilities of one or more web browsers. A computer receives an indication of an event affecting one or more content rendering capabilities of a first web browser of one or more web browsers. The computer, in response to receiving the indication of the event affecting the one or more content rendering capabilities of the first web browser, determines the one or more content rendering capabilities of the first web browser. The computer updates a data file responsive to the determination of the one or more content rendering capabilities of the first web browser.

DETAILED DESCRIPTION

Figure 1:
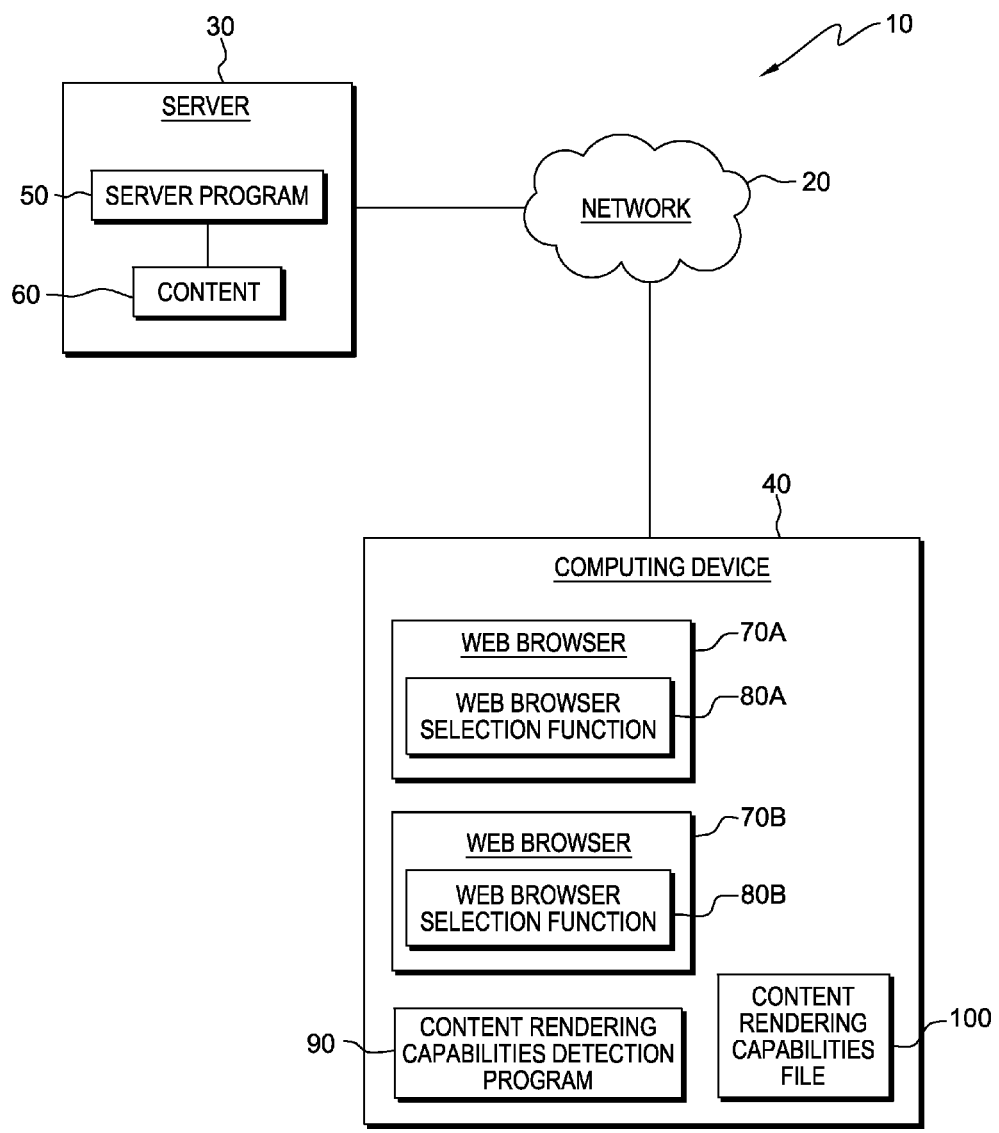
FIG. 1 depicts a diagram of a computing system in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures.

FIG. 1 depicts a diagram of computing system 10 in accordance with one embodiment of the present invention. FIG. 1 provides only an illustration of one embodiment and does not imply any limitations with regard to the environments in which different embodiments may be implemented.

In the depicted embodiment, computing system 10 includes server 30 and computing device 40 interconnected over network 20. Network 20 may be a local area network (LAN), a wide area network (WAN) such as the Internet, a cellular data network, any combination thereof, or any combination of connections and protocols that will support communications between server 30 and computing device 40 in accordance with embodiments of the invention. Network 20 may include wired, wireless, or fiber optic connections. Computing system 10 may include additional computing devices, servers, or other devices not shown.

Server 30 may be a server computer such as a management server, a web server, or any other electronic device capable of receiving and sending data. In another embodiment, server 30 may represent a server computing system utilizing multiple computers as a server system, such as in a cloud computing environment. Server 30 contains server program 50 and content 60.

Computing device 40 may be a laptop computer, tablet computer, personal digital assistant (PDA), or smart phone. In general, computing device 40 may be any electronic device or computing system capable of sending and receiving data, executing program instructions, and communicating with server 30 over network 20.

Server program 50 operates to receive and manage requests for a resource from web browser 70A and web browser 70B. In one embodiment, a resource may be an internet resource such as a webpage that is on a website. In another embodiment, a resource may be a web application. A web application may be an application that is accessed over a network such as the Internet. In general, a resource may be any computer resource whose location may be specified by a URL. For example, a file stored locally may have a URL with a prefix of "file" and a resource to be retrieved over the internet using Hypertext Transfer Protocol (HTTP) may have a URL with a prefix of "HTTP."

In one embodiment, server program 50 resides on server 30. In other embodiments, server program 50 may reside on another server or another computing device, provided that server program 50 is accessible to web browser 70A and web browser 70B, and provided that server program 50 has access to content 60.

Content 60 may be any content that can be part of a webpage or a web application. In one embodiment, content 60 may include HTML 5 files and any associated content such as text, images, video, and audio. Content 60 is accessed and sent to web browser 70A or web browser 70B by server program 50. In one embodiment, content 60 is located on server 30. In another embodiment, content 60 may be located on another server, electronic device or computing system, provided that content 60 is accessible to server program 50.

Web browsers 70A and 70B operate on computing device 40. Web browsers 70A and 70B may be dedicated web browser applications such as Internet Explorer® (registered trademark of Microsoft Corporation) or Safari® (registered trademark of Apple Inc.). In general, web browsers 70A and 70B may be any applications that provide resource retrieval functions and content rendering capabilities.

In general, content rendering capabilities are the capabilities of a web browser's content rendering engine to transform certain marked up content, formatting information, and any other associated content of a webpage into to an interactive document. For example, content rendering capabilities may include the capabilities of a web browser's content rendering engine to render a markup language such as HTML 5. Different content rendering engines have different levels of support for features of markup languages such as HTML 5 (e.g., some content rendering engines will support more features of HTML 5 than others). In one embodiment, web browsers 70A and 70B each include a distinctive set of content rendering capabilities.

Web browser selection function 80A operates to determine one or more web browsers that include at least one content rendering capability needed to render requested content. In one embodiment, web browser selection function 80A determines at least one content rendering capability needed to render the requested content. Web browser selection function 80A determines, in response to determining at least one content rendering capability needed to render the requested content, one or more web browsers that include at least one content rendering capability needed to render. In another embodiment, web browser selection function 80A may determine one or more web browsers that include all the content rendering capabilities needed to render requested content. Web browser selection functions 80A and 80B operate in the same manner.

In one embodiment, web browser selection functions 80A and 80B are functions of web browsers 70A and 70B, respectively, on computing device 40. In other embodiments, web browser selection functions 80A and 80B may be combined into a single program separate from web browses 70A and 70B, or be separate programs that reside on other computing devices, provided that web browser selection functions 80A and 80B can communicate with web browsers 70A and 70B, respectively, and provided that web browser selection functions 80A and 80B have access to content rendering capabilities file 100.

Content rendering capabilities detection program 90 operates to determine content rendering capabilities of one or more web browsers. In one embodiment, content rendering capabilities detection program 90, in response to receiving an indication of an event affecting content rendering capabilities of a first web browser of one or more web browsers, determines one or more content rendering capabilities of the first web browser. Content rendering capabilities detection program 90 updates content rendering capabilities file 100 describing the content rendering capabilities of the one or more web browsers. In another embodiment, content rendering capabilities detection program 90, in response to receiving an indication of an event affecting the content rendering capabilities of the first web browser, determines one or more content rendering capabilities of each of the one or more web browsers. Content rendering capabilities detection program 90 updates content rendering capabilities file 100 describing the content rendering capabilities of the one or more web browsers.

An event affecting the content rendering capabilities of a web browser may be the installation of a web browser on computing device 40. An event affecting the content rendering capabilities of a web browser may also be the update or upgrade of an existing browser on computing device 40, the installation of a plug-in, add-on, or any other software component that would add specific functionality to a web browser that exists on computing device 40. An event affecting the content rendering capabilities of a web browser may also be the removal of a web browser from computing device 40.

In one embodiment, content rendering capabilities detection program 90 resides on computing device 40. In other embodiments, content rendering capabilities detection program 90 may reside on another computing device, provided that content rendering capabilities detection program 90 can communicate with web browsers 70A and 70B and provided that content rendering capabilities detection program 90 has access to content rendering capabilities file 100.

Content rendering capabilities file 100 is a repository that contains the content rendering capabilities of each of the one or more web browsers. In one embodiment, content rendering capabilities file 100 is a data file that may be written to by content rendering capabilities detection program 90 and read by web browser selection functions 80A and 80B. In other embodiments, content rendering capabilities file 100 may be a database such as an Oracle® database or an IBM® DB2® database.

In one embodiment, content rendering capabilities file 100 is located on computing device 40. In another embodiment, content rendering capabilities file 100 may be located on another server or another computing device, provided that content rendering capabilities file 100 is accessible to content rendering capabilities detection program 90 and web browser selection functions 80A and 80B.

Figure 4:
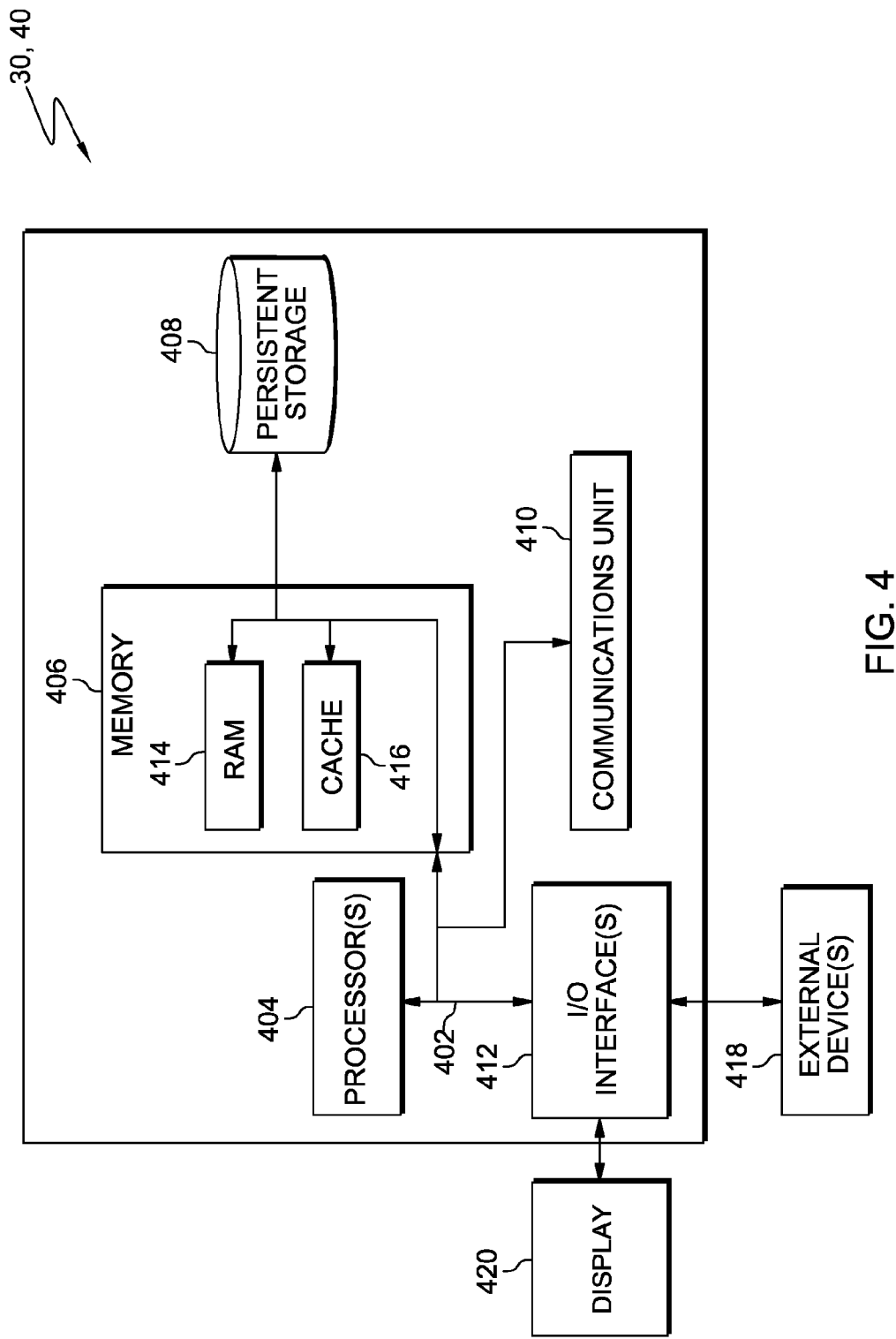
FIG. 4 depicts a block diagram of components of the server and the computing device of FIG. 1 in accordance with one embodiment of the present invention.

Server 30 and computing device 40 may each include components as depicted in further detail with respect to FIG. 4.

Figure 2:
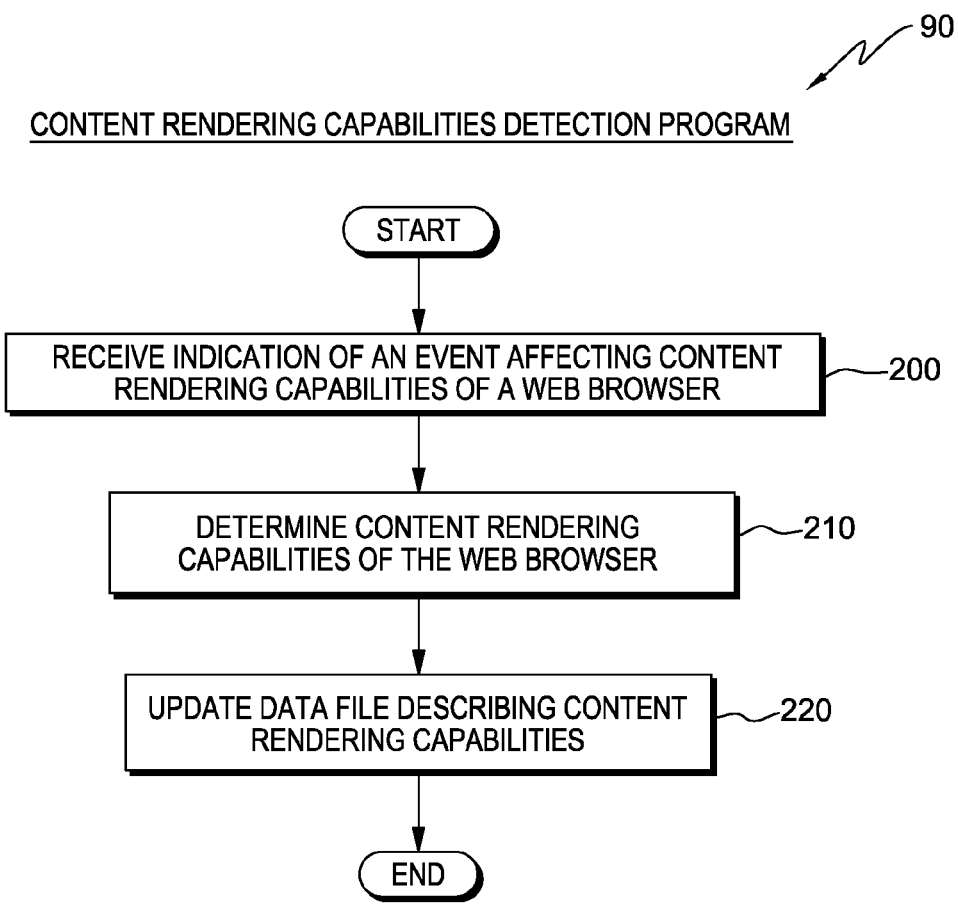
FIG. 2 depicts a flowchart of the steps of a content rendering capabilities detection program executing within the computing system of FIG. 1, for determining content rendering capabilities of one or more web browsers, in accordance with one embodiment of the present invention.

FIG. 2 depicts a flowchart of the steps of content rendering capabilities detection program 90 executing within computing system 10 of FIG. 1, for determining content rendering capabilities of one or more web browsers, in accordance with one embodiment of the present invention.

In one embodiment, initially, a user at a user interface to computing device 40 inputs a command for computing device 40 to perform an event affecting content rendering capabilities of a first web browser of one or more web browsers. For example, the user may input a command for computing device 40 to upgrade web browser 70A on computing device 40.

In one embodiment, the operating system of computing device 40 sends an indication of the event affecting content rendering capabilities of the first web browser of the one or more web browsers to content rendering capabilities detection program 90. In another embodiment, the program performing the event affecting content rendering capabilities of the first web browser (installation, upgrade, removal, etc.) sends the indication of the event affecting content rendering capabilities of the first web browser of the one or more web browsers to content rendering capabilities detection program 90.

In step 200, content rendering capabilities detection program 90 receives the indication of the event affecting content rendering capabilities of the first web browser of the one or more web browsers. In one embodiment, content rendering capabilities detection program 90 receives the indication of the event affecting content rendering capabilities of the first web browser of the one or more web browsers from the operating system of computing device 40.

In one embodiment, in response to receiving the indication of the event affecting content rendering capabilities of the first web browser of the one or more web browsers, content rendering capabilities detection program 90 determines one or more content rendering capabilities of the first web browser (step 210).

In one embodiment, content rendering capabilities detection program 90 uses a feature detection method to determine the content rendering capabilities of web browser 70A. For example, one feature detection method includes running a series of small tests in a web browser that look for the availability of a specific object, method, property or behavior. This may be done by trying to create a new instance of the feature in question and if that instantiation returns something other than null, the web browser supports this feature.

The feature detection code to carry out the feature detection methods mentioned above may be programmed manually in to content rendering capabilities detection program 90. Content rendering capabilities detection program 90 may also use a JavaScript library with built-in code to detect features of a web browser. For example, Modernizr and Dojo Toolkit are two JavaScript® (registered trademark of Oracle America, Inc.) libraries that support feature detection. Dojo Toolkit contains modules that provide feature detection functionality. The "dojo/has" module provides standardized feature detection with an extensible Application Programming Interface (API), dojo/has API. Content rendering capabilities detection program 90 may conduct a series of tests, on web browser 70A, using the dojo/has API.

In another embodiment, in response to receiving the indication of the event affecting content rendering capabilities of the first web browser of the one or more web browsers, content rendering capabilities detection program 90 determines one or more content rendering capabilities of each of the one or more web browsers (step 210). In one embodiment, content rendering capabilities detection program 90 uses a feature detection method to determine the content rendering capabilities of web browser 70A and 70B. The feature detection method may be the same as discussed above.

In one embodiment, the one or more web browsers may exist on computing device 40. In another embodiment, the one or more web browsers may also include one or more web browsers that are not installed on computing device 40. For the one or more web browsers that are not installed on computing device 40, content rendering capabilities detection program 90 accesses a public resource describing the content rendering capabilities of the one or more web browsers not installed on computing device 40. The public resource may be a web page listing the content rendering capabilities of a web browser, such as a Wikipedia® (registered trademark of the Wikimedia Foundation, Inc.) page comparing the levels of HTML 5 support between web browser layout engines.

In yet another embodiment, if the event affecting the content rendering capabilities of the first web browser is the removal of the first web browser, in response to receiving the indication of the event, content rendering capabilities detection program 90 determines that the first web browser has no content rendering capabilities (step 210). Content rendering capabilities detection program 90 removes the one or more content rendering capabilities of the first web browser from content rendering capabilities file 100 (step 220).

In step 220, content rendering capabilities detection program 90 updates content rendering capabilities file 100 describing the content rendering capabilities of the one or more web browsers. In one embodiment, if the event affecting the content rendering capabilities of the first web browser is not the removal of the first web browser, content rendering capabilities detection program 90 adds the one or more content rendering capabilities of the first web browser of the one or more web browsers to content rendering capabilities file 100.

Figure 3:
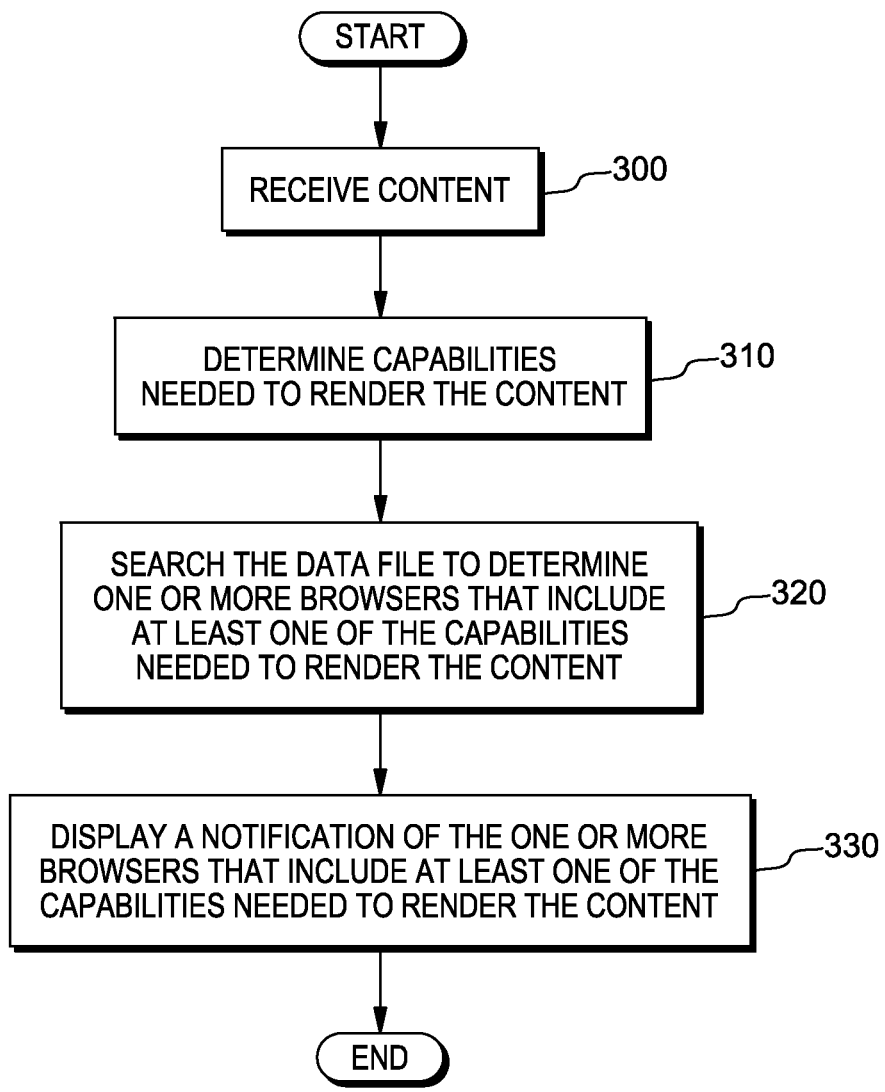
FIG. 3 depicts a flowchart of the steps of a web browser selection function executing within the computing system of FIG. 1, for determining one or more web browsers that include at least one content rendering capability needed to render requested content, in accordance with one embodiment of the present invention.

FIG. 3 depicts a flowchart of the steps of web browser selection functions 80A and 80B executing within computing system 10 of FIG. 1, for determining one or more web browsers that include at least one content rendering capability needed to render requested content, in accordance with one embodiment of the present invention.

In one embodiment, initially, a user at a user interface to web browser 70A inputs a URL of an internet resource (e.g., a webpage on a website). Web browser 70A sends a request for the internet resource to server program 50 over network 20. Server program 50 accesses and sends content 60 (content that is part of the internet resource) to web browser 70A over network 20. Web browser 70A receives content 60 and forwards content 60 to web browser selection function 80A. In another embodiment, server program 50 sends content 60 directly to web browser selection function 80A.

In step 300, web browser selection function 80A receives content 60. In response to receiving content 60, web browser selection function 80A determines at least one content rendering capability needed to render content 60 (step 310). In another embodiment, Web browser selection function 80A determines all content rendering capabilities needed to render content 60. In one embodiment, web browser selection function 80A accesses the metadata of content 60 to retrieve the at least one content rendering capability needed to render content 60. For example, a webpage may include metadata specifying what language it is written in, what tools were used to create it, and where to go for more on the subject.

In step 320, web browser selection function 80A searches content rendering capabilities file 100 to determine one or more web browsers that include the at least one content rendering capability needed to render content 60. In one embodiment, web browser selection function 80A fetches, from content rendering capabilities file 100, the one or more content rendering capabilities of each of the one or more web browsers. Web browser selection function 80A compares the at least one content rendering capability needed to render content 60 to the one or more content rendering capabilities of each of the one or more web browsers.

In another embodiment, web browser selection function 80A searches content rendering capabilities file 100 to determine one or more web browsers that include all the content rendering capabilities needed to render content 60.

In step 330, web browser selection function 80A displays a notification of the one or more browsers that include the at least one content rendering capability needed to render content 60. In one embodiment, web browser selection function 80A sends a prompt to a user interface of computing device 40 that indicates the one or more browsers that include the at least one content rendering capability needed to render content 60. In another embodiment, web browser selection function 80A sends a notification of the one or more browsers that include the at least one content rendering capability needed to render content 60 to web browser 70A. Web browser 70A sends a prompt to a user interface of web browser 70A that indicates the one or more browsers that include the at least one content rendering capability needed to render content 60.

FIG. 4 depicts a block diagram of components of server 30 and computing device 40 in accordance with one embodiment of the present invention. It should be appreciated that FIG. 4 provides only an illustration of one implementation and does not imply any limitations with regard to the environments in which different embodiments may be implemented. Many modifications to the depicted environment may be made.

Server 30 and computing device 40 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In one embodiment, memory 406 includes random access memory (RAM) 414 and cache memory 416. In general, memory 406 can include any suitable volatile or non-volatile computer-readable storage media.

Server program 50 and content 60 are stored in persistent storage 408 of server 30 for execution and/or access by one or more of the respective computer processors 404 of server 30 via one or more memories of memory 406 of server 30. Web browser 70A, web browser 70B, web browser selection function 80A, web browser selection function 80B, content rendering capabilities detection program 90, and content rendering capabilities file 100 are stored in persistent storage 408 of computing device 40 for execution and/or access by one or more of the respective computer processors 404 of computing device 40 via one or more memories of memory 406 of computing device 40. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other servers, data processing systems, or devices. In these examples, communications unit 410 includes one or more network interface cards. Communications unit 410 may provide communications through the use of either or both physical and wireless communications links. Server program 50 and content 60 may be downloaded to persistent storage 408 of server 30 through communications unit 410 of server 30. Web browser 70A, web browser 70B, web browser selection function 80A, web browser selection function 80B, content rendering capabilities detection program 90, and content rendering capabilities file 100 may be downloaded to persistent storage 408 of computing device 40 through communications unit 410 of computing device 40.

I/O interface(s) 412 allows for input and output of data with other devices that may be connected to computing system 10. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., server program 50 and content 60, can be stored on such portable computer-readable storage media and can be loaded onto persistent storage 408 of server 30 via I/O interface(s) 412 of server 30. Software and data used to practice embodiments of the present invention, e.g., web browser 70A, web browser 70B, web browser selection function 80A, web browser selection function 80B, content rendering capabilities detection program 90, and content rendering capabilities file 100, can be stored on such portable computer-readable storage media and can be loaded onto persistent storage 408 of computing device 40 via I/O interface(s) 412 of computing device 40. I/O interface(s) 412 also connect to a display 420.

Display 420 provides a mechanism to display data to a user and may be, for example, a computer monitor or a touch screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for determining content rendering capabilities of one or more web browsers, the method comprising the steps of:
   a computer receiving an indication of an event affecting one or more content rendering capabilities of a first web browser of one or more web browsers;
   the computer, in response to receiving the indication of the event affecting the one or more content rendering capabilities of the first web browser, determining the one or more content rendering capabilities of the first web browser, wherein the determining comprises running a series of tests in the first web browser and accessing a public resource describing content rendering capabilities of web browsers; and
   the computer updating a data file responsive to the determination of the one or more content rendering capabilities of the first web browser.

2. The method of claim 1, further comprising the steps of:
   the computer receiving content to render;
   the computer determining at least one content rendering capability needed to render the content; and
   the computer searching the data file to determine one or more web browsers that include the at least one content rendering capability needed to render the content.

3. The method of claim 2, further comprising the computer displaying a notification of the one or more web browsers that include the at least one content rendering capability needed to render the content.

4. The method of claim 1, wherein the event affecting one or more content rendering capabilities of the first web browser is the installation of the first web browser.

5. The method of claim 1, wherein the event affecting one or more content rendering capabilities of the first web browser is the upgrade of the first web browser.

6. The method of claim 1, wherein the event affecting one or more content rendering capabilities of the first web browser is the removal of the first web browser.

7. A computer program product for determining content rendering capabilities of one or more web browsers, the computer program product comprising:
   one or more computer-readable tangible storage media and program instructions stored on at least one of the one or more storage media, the program instructions comprising:

program instructions to receive an indication of an event affecting one or more content rendering capabilities of a first web browser of one or more web browsers;

program instructions, in response to receiving the indication of the event affecting the one or more content rendering capabilities of the first web browser, to determine the one or more content rendering capabilities of the first web browser, wherein the program instructions to determine comprise program instructions to run a series of tests in the first web browser and program instructions to access a public resource describing content rendering capabilities of web browsers; and program instructions update a data file responsive to the determination of the one or more content rendering capabilities of the first web browser.

8. The computer program product of claim 7, further comprising:

program instructions, stored on at least one of the one or more storage media, to receive content to render;

program instructions, stored on at least one of the one or more storage media, to determine at least one content rendering capability needed to render the content; and program instructions, stored on at least one of the one or more storage media, to search the data file to determine one or more web browsers that include the at least one content rendering capability needed to render the content.

9. The computer program product of claim 8, further comprising program instructions, stored on at least one of the one or more storage media, to display a notification of the one or more web browsers that include the at least one content rendering capability needed to render the content.

10. The computer program product of claim 7, wherein the event affecting one or more content rendering capabilities of the first web browser is the installation of the first web browser.

11. The computer program product of claim 7, wherein the event affecting one or more content rendering capabilities of the first web browser is the upgrade of the first web browser.

12. The computer program product of claim 7, wherein the event affecting one or more content rendering capabilities of the first web browser is the removal of the first web browser.

13. A computer system for determining content rendering capabilities of one or more web browsers, the computer system comprising:

one or more computer processors;

one or more computer-readable storage media;

program instructions stored on the computer-readable storage media for execution by at least one of the one or more processors, the program instructions comprising:

program instructions to receive an indication of an event affecting one or more content rendering capabilities of a first web browser of one or more web browsers;

program instructions, in response to receiving the indication of the event affecting the one or more content rendering capabilities of the first web browser, to determine the one or more content rendering capabilities of the first web browser, wherein the program instructions to determine comprise program instructions to run a series of tests in the first web browser and program instructions to access a public resource describing content rendering capabilities of web browsers; and program instructions update a data file responsive to the determination of the one or more content rendering capabilities of the first web browser.

14. The computer system of claim 13, further comprising:

program instructions, stored on the computer-readable storage media for execution by at least one of the one or more processors, to receive content to render;

program instructions, stored on the computer-readable storage media for execution by at least one of the one or more processors, to determine at least one content rendering capability needed to render the content; and program instructions, stored on the computer-readable storage media for execution by at least one of the one or more processors, to search the data file to determine one or more web browsers that include the at least one content rendering capability needed to render the content.

15. The computer system of claim 14, further comprising program instructions, stored on the computer-readable storage media for execution by at least one of the one or more processors, to display a notification of the one or more web browsers that include the at least one content rendering capability needed to render the content.

16. The computer system of claim 13, wherein the event affecting one or more content rendering capabilities of the first web browser is the installation of the first web browser.

17. The computer system of claim 13, wherein the event affecting one or more content rendering capabilities of the first web browser is the upgrade of the first web browser.

18. The computer system of claim 13, wherein the event affecting one or more content rendering capabilities of the first web browser is the removal of the first web browser.

19. The method of claim 1, wherein running a series of tests in the first web browser comprises attempting to create a new instance of a feature in the first web browser.

* * * * *